(12) United States Patent
Zhao et al.

(10) Patent No.: US 10,098,079 B2
(45) Date of Patent: *Oct. 9, 2018

(54) POWER CONTROL OF DEVICE-TO-DEVICE SYNCHRONIZATION SIGNAL

(71) Applicant: Telefonaktiebolaget LM Ericsson (publ), Stockholm (SE)

(72) Inventors: Zhenshan Zhao, Beijing (CN); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/650,172

(22) Filed: Jul. 14, 2017

(65) Prior Publication Data

US 2017/0325183 A1 Nov. 9, 2017

Related U.S. Application Data

(63) Continuation of application No. 14/762,680, filed as application No. PCT/SE2015/050287 on Mar. 13, 2015, now Pat. No. 9,807,711.

(Continued)

(51) Int. Cl.
*H04W 52/38* (2009.01)
*H04W 56/00* (2009.01)
(Continued)

(52) U.S. Cl.
CPC ........... *H04W 52/383* (2013.01); *H04W 4/70* (2018.02); *H04W 52/322* (2013.01);
(Continued)

(58) Field of Classification Search
CPC .......... H04W 52/0229; H04W 56/001; H04W 56/002; H04W 56/00
See application file for complete search history.

(56) References Cited

U.S. PATENT DOCUMENTS 9,807,711 B2 * 10/2017 Zhao .................. H04W 52/322
2013/0272262 A1 * 10/2013 Li ......................... H04W 28/02
370/330

(Continued)

FOREIGN PATENT DOCUMENTS

JP 2015516785 6/2015
RU 2010145188 A 5/2012
(Continued)

OTHER PUBLICATIONS

3GPP TSG-RAN WG1 #76, R1-140462, Prague, Czech Republic, Agenda item: 7.2.8.1.1 Source: Qualcomm Incorporated Title: Signal Design for D2D Synchronization Document for: Discussion/Decision Feb. 10, 2014 consisting of 7-pages.
(Continued)

*Primary Examiner* — Bobbak Safaipour
(74) *Attorney, Agent, or Firm* — Christopher & Weisberg, P.A.

(57) ABSTRACT

A method and system for setting a power of a secondary device-to-device synchronization signal, SD2DSS, by a first wireless device to enable a second wireless device to synchronize timing of the second wireless device to a timing of the first wireless device are disclosed. According to one aspect, a method includes determining power of a first signal transmitted by the first wireless device, and setting the power of the SD2DSS based on the power of the first signal.

16 Claims, 12 Drawing Sheets

Related U.S. Application Data

(60) Provisional application No. 61/954,664, filed on Mar. 18, 2014.

(51) Int. Cl.
  *H04W 52/32* (2009.01)
  *H04W 52/36* (2009.01)
  *H04W 4/70* (2018.01)
  *H04L 27/26* (2006.01)

(52) U.S. Cl.
  CPC ......... *H04W 52/36* (2013.01); *H04W 56/001* (2013.01); *H04W 56/002* (2013.01); *H04W 56/0015* (2013.01); *H04L 27/2614* (2013.01)

(56) References Cited

U.S. PATENT DOCUMENTS

| | | | | |
|---|---|---|---|---|
| 2014/0120934 A1* | 5/2014 | Kishiyama | .......... | H04W 76/023 455/452.1 |
| 2015/0223217 A1* | 8/2015 | Chen | .......... | H04W 72/00 370/329 |
| 2016/0174179 A1* | 6/2016 | Seo | .......... | H04W 76/14 370/350 |
| 2016/0205644 A1* | 7/2016 | Seo | .......... | H04W 56/00 370/350 |
| 2016/0286506 A1* | 9/2016 | Chae | .......... | H04W 56/002 |
| 2016/0286507 A1* | 9/2016 | Yang | .......... | H04W 8/005 |

FOREIGN PATENT DOCUMENTS

| | | |
|---|---|---|
| RU | 2012108647 A | 9/2013 |
| WO | 2009126658 A1 | 10/2009 |
| WO | 2013059598 A1 | 4/2013 |
| WO | 201317115 A1 | 11/2013 |
| WO | 2015142251 A1 | 9/2015 |

OTHER PUBLICATIONS

3GPP TSG RAN WG1 Meeting #76, R1-140839, Prague, Czech Republic, Agenda item: 7.2.8.1.1 Source: LG Electronics Title: On the Design of D2DSS and PD2DSCH Document for: Discussion and Decision Feb. 10, 2014 consisting of 8-pages.
International Search Report and Written Opinion dated Jun. 5, 2015 for International Application Serial No. PCT/SE2015/050287, International Filing Date: Mar. 13, 2015, consisting of 9 pages.
Russian Office Action and English Translation dated Jun. 21, 2017 for Russian Application Serial No. 2016140826, filed on Mar. 13, 2015 consisting of 10-pages.
Chilean Office Action and Translation dated Dec. 20, 2017 for Patent Application No. 2016-002206, Filed on Jan. 9, 2016, consisting of 11-pages.
3GPP TSG-RAN WG1 Meeting #76 R1-140839; Title: "On the Design of D2DSS and PD2DSCH"; Source: LG Electronics; Agenda item: 7.2.8.11; Document for: Discussion and Decision; Location and Date: Prague, Czech, Feb. 10-14, 2014 consisting of 8-pages.
3GPP TSG-RAN WG1 Meeting #76 R1-140462; Title: "Signal Design for D2D Synchronization"; Source: Qualcomm Incorporated; Agenda item: 7.2.8.1.1; Document for: Discussion/Decision; Location and Date: Prague, Czech Feb. 10-14, 2014 consisting of 7-pages.
Japanese Office Action and English Translation dated Oct. 29, 2017 for Japanese Application Serial No. 2016-555985, filed on Oct. 29, 2010 consisting of 3-pages.
Korean Patent Allowance Document and Translation dated May 9, 2018 for Korean Patent Application No. 2016-7027083, consisting of 3-pages.

\* cited by examiner

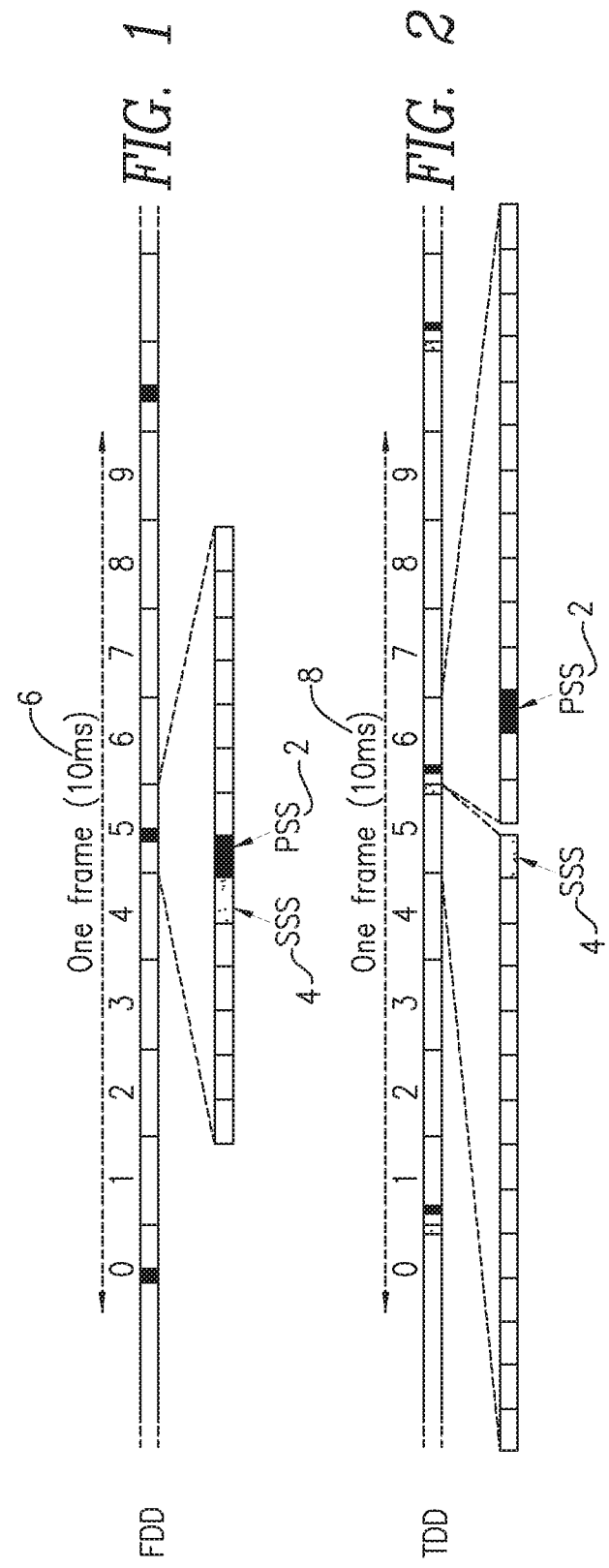

POWER CONTROL OF DEVICE-TO-DEVICE SYNCHRONIZATION SIGNAL

CROSS-REFERENCE TO RELATED APPLICATION

This application is related to and claims priority to U.S. patent application Ser. No. 14/762,680, filed Jul. 22, 2015, entitled POWER CONTROL OF DEVICE-TO-DEVICE SYNCHRONIZATION SIGNAL, which is a U.S. National Stage Application based on PCT Application No. PCT/SE2015/050287, filed Mar. 13, 2015, entitled POWER CONTROL OF DEVICE-TO-DEVICE SYNCHRONIZATION SIGNAL, which claims priority to U.S. Provisional Application Ser. No. 61/954,664, filed Mar. 18, 2014, entitled POWER CONTROL OF D2D SYNCHRONIZATION SIGNAL, the contents of all of which are incorporated herein by reference.

FIELD

Wireless communications and in particular, methods and devices for power control of a device-to-device (D2D) synchronization signal (D2DSS).

BACKGROUND

In order to synchronize the timing of a wireless device, such as a user equipment (UE), to the timing of a serving base station, a cell search is performed by the wireless device to locate and synchronize to synchronization signals contained in a downlink transmission from the base station to the wireless device. For example, a long term evolution (LTE) cell search generally consists of the following basic steps:
  Acquisition of frequency and symbol synchronization to a cell.
  Acquisition of frame timing of the cell—that is, determining the start of the downlink frame.
  Determination of the physical-layer cell identity of the cell.

There are 504 different physical-layer cell identities defined for LTE, where each cell identity corresponds to one specific downlink reference-signal sequence. The set of physical-layer cell identities is further divided into 168 cell-identity groups, with three cell identities within each group. To assist the cell search, two special signals are transmitted on each downlink component carrier: the Primary Synchronization Signal (PSS) and the Secondary Synchronization Signal (SSS). FIGS. 1 and 2 show examples of these signals, namely the PSS 2 and the SSS 4, in relation to a frame 6 for frequency division duplex (FDD) and a frame 8 for time division duplex (TDD).

Shown in FIG. 3 are three PSSs which consist of three Zadoff-Chu (ZC) sequences of length 63, extended with five zeros at the edges and mapped to the center 73 subcarriers, i.e., the center six resource blocks. In particular, an orthogonal frequency division multiplex (OFDM) modulator 12 receives the ZC sequence 10 and modulates the sequence onto the subcarriers. A cyclic-prefix 14 is inserted into the modulated sequences. Note that the center subcarrier is not actually transmitted because it coincides with the DC subcarrier. Thus, only 62 elements of the length-63 ZC sequences are actually transmitted by the base station to the wireless device. Similar to PSS, the SSS occupies the 72 resource elements, not including the DC carrier, in subframes 0 and 5, for both FDD and TDD. Different synchronization signals can be used by a receiver, separately or jointly, to perform the necessary synchronization and estimation functions. For example, PSS may be more suitable for timing acquisition because of its sequence and correlation properties that allow for an efficient time estimator implementation. On the other hand, SSS is better suited for frequency estimation, possibly jointly with PSS, also owing to its placement within the radio frame.

The SSS should be designed so that:
  The two SSS (SSS1 in subframe 0 and SSS2 in subframe 5) take their values from sets of 168 possible values corresponding to the 168 different cell-identity groups.
  The set of values applicable for SSS2 is different from the set of values applicable for SSS1 to allow for frame-timing detection from the reception of a single SSS.

The structure of the two SSSes is illustrated in FIG. 4. SSS1 16 is based on the frequency interleaving of two length-31 m-sequences X and Y, each of which can take 31 different values (actually 31 different shifts of the same m-sequence). Within a cell, SSS2 18 is based on exactly the same two sequences as SSS1 16. However, the two sequences have been swapped in the frequency domain, as shown in FIG. 4. The set of valid combinations of X and Y for SSS1 16 has then been selected so that a swapping of the two sequences in the frequency domain is not a valid combination for SSS1 16. Thus, the above requirements are fulfilled:
  The set of valid combinations of X and Y for SSS1 16 (as well as for SSS2 18) are 168, allowing for detection of the physical-layer cell identity.
  As the sequences X and Y are swapped between SSS1 16 and SSS2 18, frame timing can be found.

Traditional communication in terrestrial radio networks is via links between wireless devices, such as UEs, and base stations, such as eNodesB (eNBs) in LTE. However, when two wireless devices are in the vicinity of each other, then direct device to device (D2D) or side link communication is possible. Such communication may be dependent on synchronization information from either a base station or a different node such as a cluster head (CH), i.e., a wireless device acting as synchronization source, providing local synchronization information, or a wireless device enabled to relay synchronization information from a different synchronization source. The synchronization source from a base station or CH is used for intra-cell/cluster communication. The relayed synchronization signal is used for inter-cell/cluster communication. An illustration of synchronization sources from different nodes is shown in FIG. 5.

FIG. 5 shows a communication system 20 with a base station 22 that may service multiple cells and at least one cluster having a cluster head 24 and wireless devices 26. In FIG. 5, the base station 22 or the cluster head 24 may be sources of synchronization signals. For in-coverage D2D scenarios in an LTE system, the synchronization reference is provided by an eNB. The D2D resource pool is signaled by the eNB to indicate the resource used for the D2D communication. For out of coverage D2D scenarios, the synchronization reference is provided by the CH.

The signal design of a device-to-device synchronization signal (D2DSS) is under discussion within bodies forming the third generation partnership project (3GPP). In a current working assumption, a D2DSS comprises at least a primary D2DSS (PD2DSS) and may also include a secondary D2DSS (SD2DSS). Based on this current working assumption, the PD2DSS and SD2DSS use a Zadoff-Chu (ZC) sequence and an M sequence, respectively, which are similar to the LTE PSS and SSS, respectively, and discussed above.

Therefore, it is advantageous to reuse the LTE PSS and SSS format for the D2DSS as much as possible in order to reuse the existing timing acquisition circuit to the maximum extent.

An analysis of the peak to average power ratio (PAPR) performance of PSS and SSS shows that the PAPR of SSS is about 2 dB higher than the PABR of PSS. In order to avoid having to transmit the SSS having a higher PAPR, it has been proposed to transmit only a repeated PSS as a D2DSS and avoid transmission of SD2DSS. While this approach effectively solves the PAPR issue, it is observed that pairs of PSS/SSS signals are typically used in existing LTE wireless device implementations in order to obtain frequency synchronization to a given carrier. If SD2DSS is not based on legacy SSS or if SD2DSS is not present at all, as has been proposed, the legacy synchronization algorithms implemented in the devices cannot be fully reused for D2D synchronization. On the other hand, transmitting an SSS with a 2 dB higher PAPR will require more expensive radio amplifiers in the transmitter due to the large signal dynamic range.

SUMMARY

The present disclosure advantageously provides a method and system for setting a power of a secondary device-to-device synchronization signal, SD2DSS, by a first wireless device to enable a second wireless device to synchronize timing derived from the second wireless device to a timing of the first wireless device. According to one aspect, a method includes determining power of a first signal transmitted by the first wireless device, and setting the power of the SD2DSS based on the power of the first signal.

According to this aspect, in some embodiments, the first signal is a primary device to device synchronization signal, PD2DSS. In some embodiments, the PD2DSS includes a Zadoff-Chu, ZC, sequence and the SD2DSS includes an M sequence. In some embodiments, the power of the SD2DSS is set to be less than the power of the PD2DSS by a configurable power offset. In some embodiments, the method further includes receiving the configurable power offset via a base station. In some embodiments, the power of the SD2DSS is the minimum of a nominal value of the power of the PD2DSS and a power threshold. In some embodiments, the set power of the SD2DSS is adjusted only when the power of the first signal exceeds a predetermined amount. In some embodiments, the same circuitry generates the SD2DSS and a secondary synchronization signal, SSS.

According to another aspect, embodiments include a wireless device configured to set a power of a secondary device-to-device synchronization signal, SD2DSS, to enable a second wireless device to synchronize timing of the second wireless device to a timing of the wireless device. The wireless device includes a processor and a memory. The memory contains instructions executable by the processor. The instructions when executed configure the processor to determine power of a first signal transmitted by the wireless device; and set the power of the SD2DSS based on the power of the first signal.

According to this aspect, in some embodiments, the first signal is a PD2DSS. In some embodiments, the PD2DSS includes a Zadoff-Chu, ZC, sequence and the SD2DSS includes an M sequence. In some embodiments, the power of the SD2DSS is set to be less than the power of the PD2DSS by a configurable power offset. In some embodiments, the wireless device further includes a transceiver configured to receive the configurable power offset via a base station. In some embodiments, the SD2DSS is the minimum of a nominal value of the power of the PD2DSS and the power threshold.

According to another aspect, embodiments include a wireless device having a signal power determiner module and a SD2DSS power setting module. The signal power determiner module is configured to determine power of a first signal. The SD2DSS power setting module is configured to set power of the SD2DSS based on the monitored power of the first signal.

According to this aspect, in some embodiments, the first signal is a primary device to device synchronization signal, PD2DSS. In some embodiments, the PD2DSS includes a Zadoff-Chu, ZC, sequence and the SD2DSS includes an M sequence. In some embodiment, the power of the SD2DSS is a minimum of a nominal value of the power of the PD2DSS and a power threshold.

According to another aspect, embodiments include a method of determining and transmitting one of a power offset and a power threshold to a wireless device. At least one of a power offset and a power threshold is determined for setting a power of a secondary device to device synchronization signal, SD2DSS, by a wireless device. The at least one of the power offset and the power threshold is transmitted to the wireless device.

According to yet another aspect, embodiments include a network node having a processor, a communication interface and a memory. The memory contains instructions that when executed by the processor configure the processor to determine at least one of a power offset and a power threshold for setting a power of secondary device to device synchronization signal (SD2DSS) by a wireless device. A communication interface is configured to transmit at least one of the power offset and the power threshold to the wireless device. The memory is configured to store the at least one of the power offset and the power threshold.

According to another aspect, embodiments include a network node that includes a power offset determiner module configured to determine a power offset to be used by a wireless device to set an SD2DSS; and a power threshold determiner module configured to determine a power threshold to be used by the wireless device to determine whether to set a power of the SD2DSS.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is a diagram of a FDD frame with a PSS and an SSS;

FIG. 2 is a diagram of a TDD frame with a PSS and an SSS;

DETAILED DESCRIPTION

Figure 3:
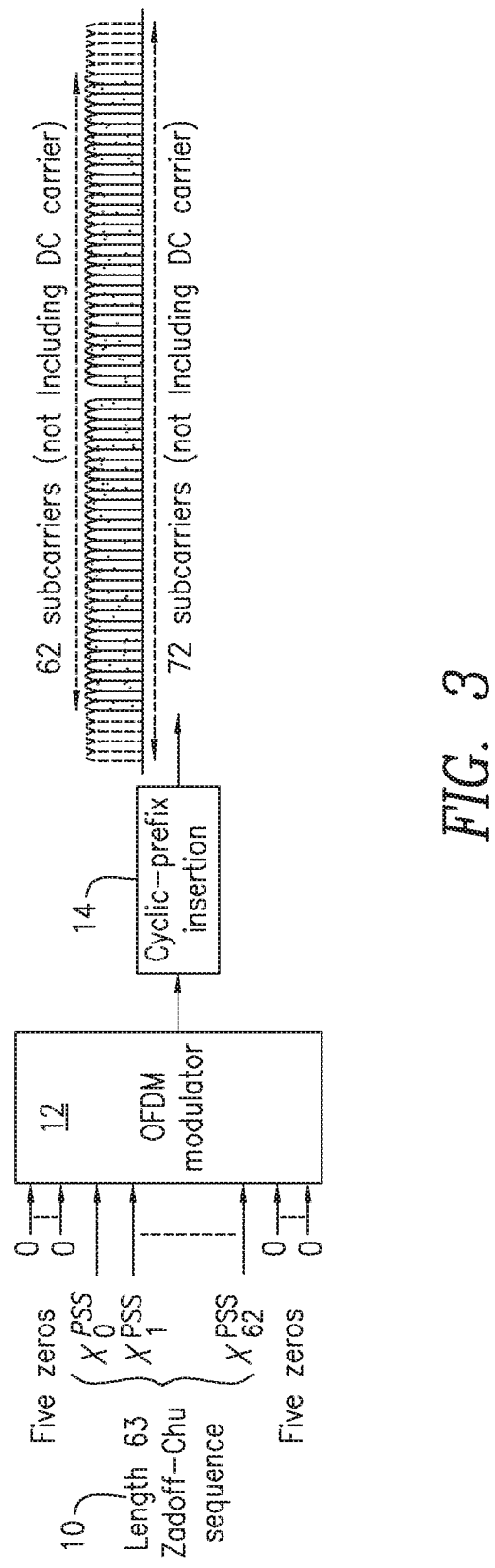
FIG. 3 is a diagram of an OFDM modulator to modulate ZC sequences onto subcarriers.

Before describing in detail example embodiments that are in accordance with the present disclosure, it is noted that the embodiments reside primarily in combinations of apparatus components and processing steps related to setting the power of synchronization signals in a device-to-device communication system. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Although this disclosure describes implementation within the context of an LTE system, embodiments are not limited to LTE technology, and can be implemented within any third generation partnership project (3GPP) technology or other wireless communication technology.

Decoupled power control of the PD2DSS and the SD2DSS (or any other D2D signal) is provided, where the transmit power of the SD2DSS is individually set, e.g., adjusted, in order to cope with transmitter implementation limitations. Implementation can be accomplished in different ways, such as where:

The SD2DSS has a predetermined or configurable power offset with respect to PD2DSS (and other D2D signals); or The SD2DSS has a power reduction that is a function of the D2D nominal transmission power.

As used herein the term "nominal" within the context of "nominal transmission power" means a desired power level according to a setting or a specification. Practically speaking, the effective transmitted power may differ from the nominal power due to, for example, calibration inaccuracy or other hardware non-idealities.

Typically, D2D signaling operates at maximum power in order to maximize the range for direct synchronization, discovery and communication even though in some cases power control may be applied to certain D2D channels. Thus, if the destination of a direct communication channel is in close proximity, the transmission power for the communication channel may be adjusted accordingly. Even when the target of a specific transmission is in proximity, it still makes sense to transmit synchronization signals with maximum power since synchronization signals are intended to be broadcast signals and the transmitter is often unaware of the location of the receivers of its synchronization signals. Therefore, power control of synchronization signals is desired.

Power control may be used with signals with large PAPR and transmitter implementations with limited dynamic range. In LTE, power control may be used in the uplink (UL) where the transmitted signals may have relatively large PAPR depending on the modulation format and other parameters. Wireless devices, e.g., UEs, may, in this case, apply a power backoff, i.e., limit the transmit power in order to cope with the limited dynamic range of the power amplifier. Power backoff may be applied to the whole UL transmission, or at least to a given UL channel.

A modified power backoff solution is described herein for allowing efficient wireless device implementation when transmitting D2D sync signals at maximum power. Even though embodiments are described in the context of the D2DSS, the principles shown here can be applied to other signals, also, including coded signals and channel-coded transmissions. It is assumed in the following discussion that the PD2DSS is based on a sequence with low PAPR, e.g., ZC sequence, while the SD2DSS is derived from a sequence with relatively higher PAPR, e.g., M-sequences.

Of note, the D2DSS, e.g., the PD2DSS and the SD2DSS, is composed of multiple reference signals (RSs) with different PAPR characteristics. It may be assumed that the PD2DSS and the SD2DSS are time multiplexed, so that individual power control of the PD2DSS and the SD2DSS is possible. Also, timing acquisition may be performed based on the PD2DSS only, e.g., with a time correlation operation. However, frequency estimation is often performed by comparing the phase of the signals associated to closely spaced RSs such as the PD2DSS and the SD2DSS. Frequency may be estimated with a correlator such as:

$f_{est} = \text{angle}(y_P^* y_S)/(2\pi T)$ where T is the time spacing between PD2DSS/SD2DSS, $y_P$ is the received signal corresponding to the PD2DSS and $y_S$ is the received signal corresponding to the SD2DSS. In this case, the estimation bias is insensitive to any scalar gain applied to either the PD2DSS or the SD2DSS.

Figure 6:
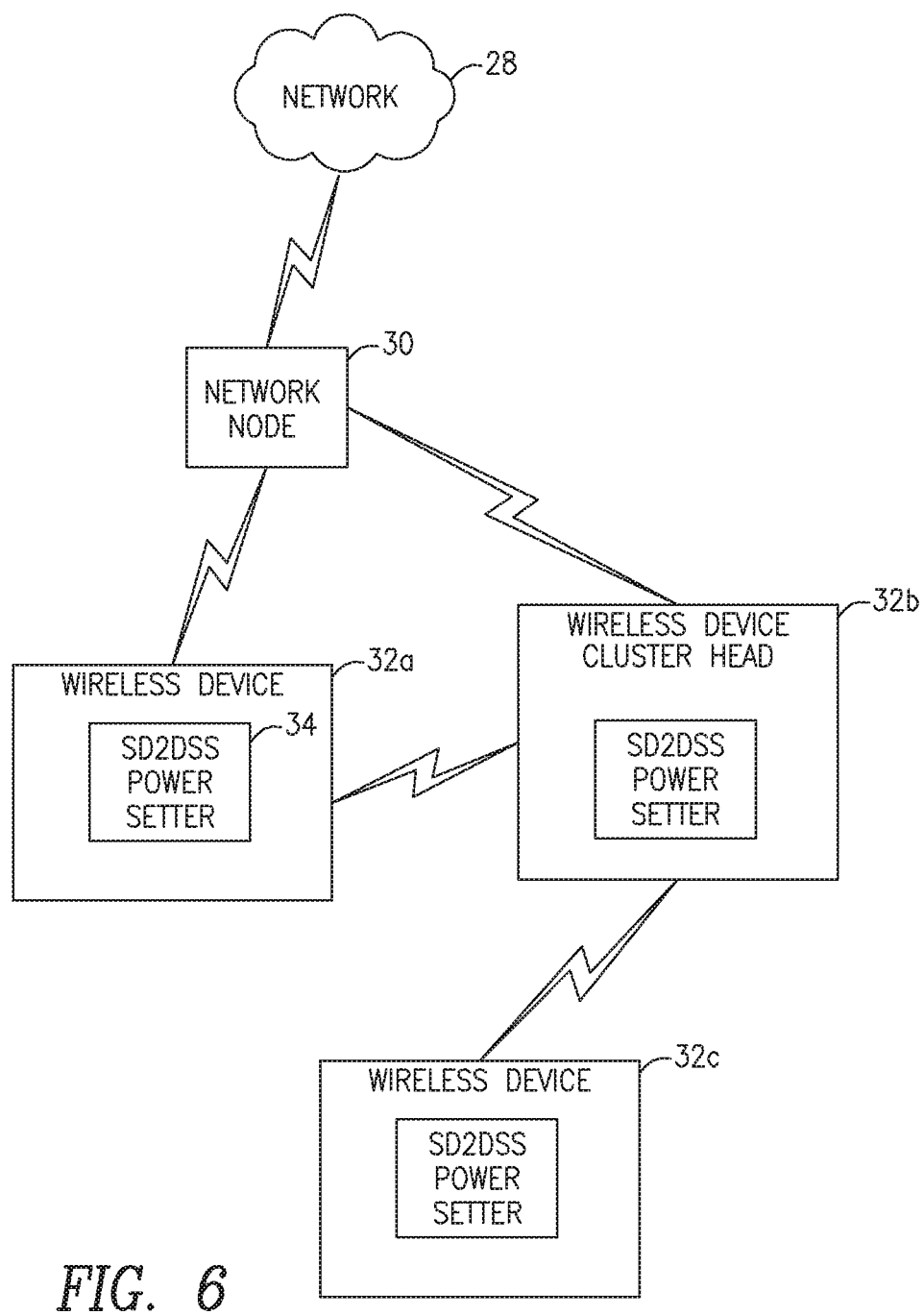
FIG. 6 is a block diagram of a wireless communication system constructed according to one embodiment.

FIG. 6 is a block diagram of a wireless communication system including a backhaul network 28, a network node 30 and a collection of wireless devices 32a, 32b and 32c, referred to collectively herein as wireless devices 32. A wireless device 32 may include SD2DSS power setter 34 configured to set a power of an SD2DSS according to methods described herein. As used herein, the term "set" may include initial establishment of the SD2DSS power, resetting of the SD2DSS power or an adjustment of the SD2DSS power. In other words, the term "set" as used herein is not limited to the initial start-up value.

In FIG. 6, the wireless device 32b may operate as a cluster head to which other wireless devices such as wireless device 32c may synchronize. Also, wireless devices 32 may communicate directly, i.e., engage in D2D communications, as is shown with respect to wireless devices 32b and 32d.

Figure 7:
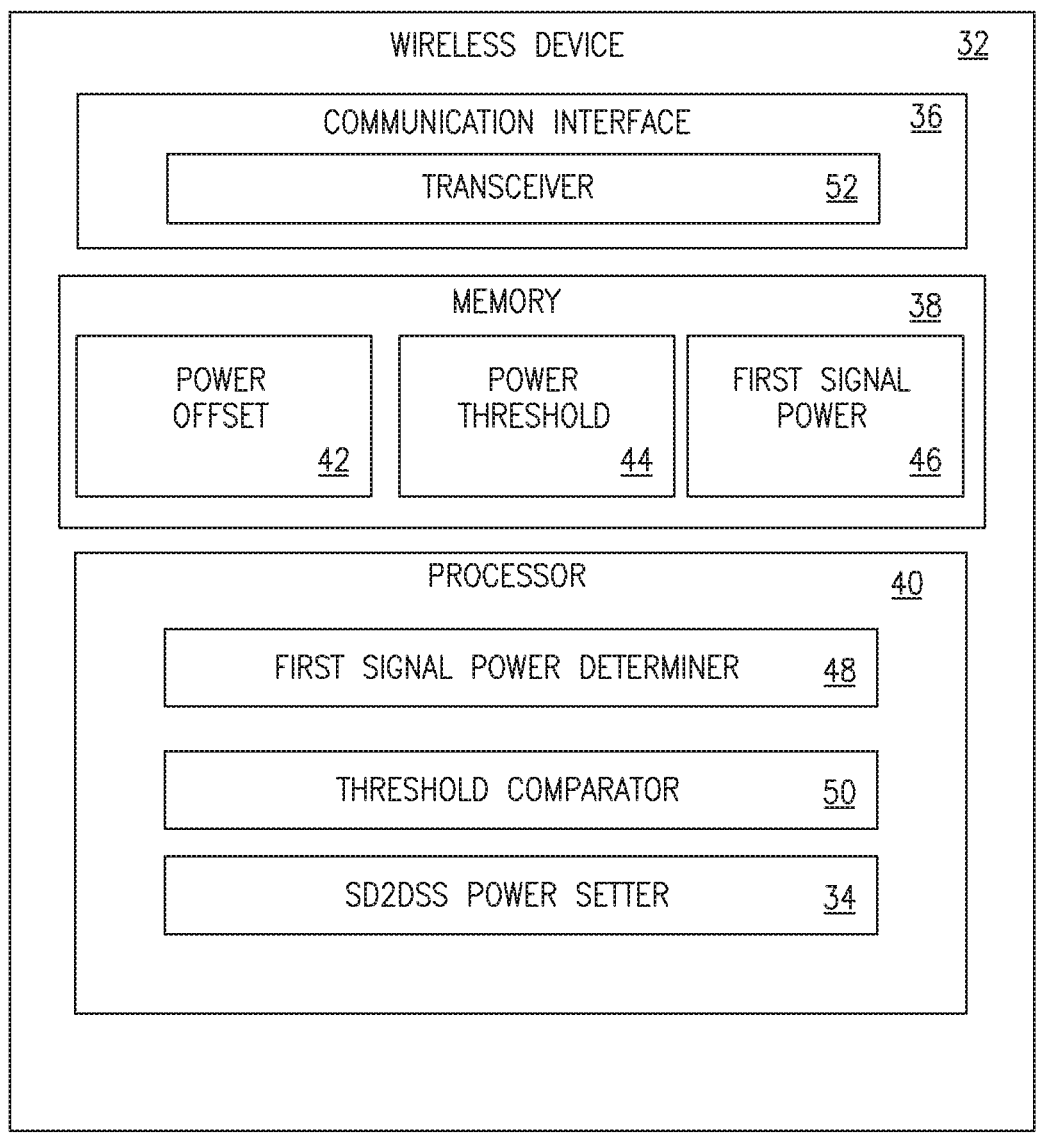
FIG. 7 is a block diagram of a wireless device according to one embodiment.

FIG. 7 is a block diagram of a wireless device 32 constructed in accordance with principles of some embodiments described herein. The term wireless device as used herein is non-limiting and can be, for example, a mobile telephone, laptop computer, tablet, appliance, automobile or any other device that has a wireless transceiver. The wireless device 32 includes a communication interface 36, a memory 38 and a processor 40. The memory 38 is configured to store a power offset 42, a power threshold 44, and a first signal power 46. Note that the power offset 42 may also be referred to herein as an offset value or a power offset value. The processor 40 may include functionality to determine a power of a first signal, such as a D2D signal via a first signal power determiner 48. The processor 40 may be configured to make an SSS offset power adjustment. The processor may also be configured to compare power of a PSS signal to a threshold via threshold comparator 50. The processor may also be configured to set, e.g., adjust the SSS signal power via the SD2DSS power setter 34. In some embodiments, the power offset 42 and/or the power threshold 44 may be set in a network node 30, such as a base station, and received by a transceiver 52 of the communication interface 36.

In operation, the wireless device 32 determines a first signal power 46 transmitted by the wireless device 32 and sets the power of the SD2DSS based on the determined power of the first signal. In some embodiments, the power of the SD2DSS is set to be less than the first signal by a predetermined power offset 42. In some embodiments, the set SD2DSS power is adjusted only if the SD2DSS power exceeds a predetermined amount. In some embodiments, the SD2DSS is set to be a minimum of the first signal power 46 and a power threshold 44. The SD2DSS may be generated by the same circuitry that computes a legacy secondary synchronization signal.

Figure 8:
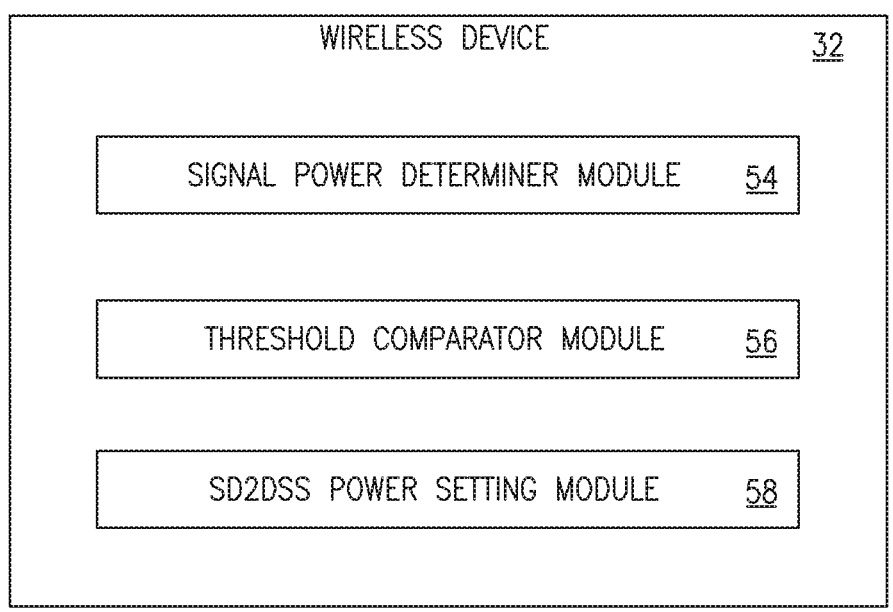
FIG. 8 is a block diagram of a wireless device according to another embodiment.
Figure 9:
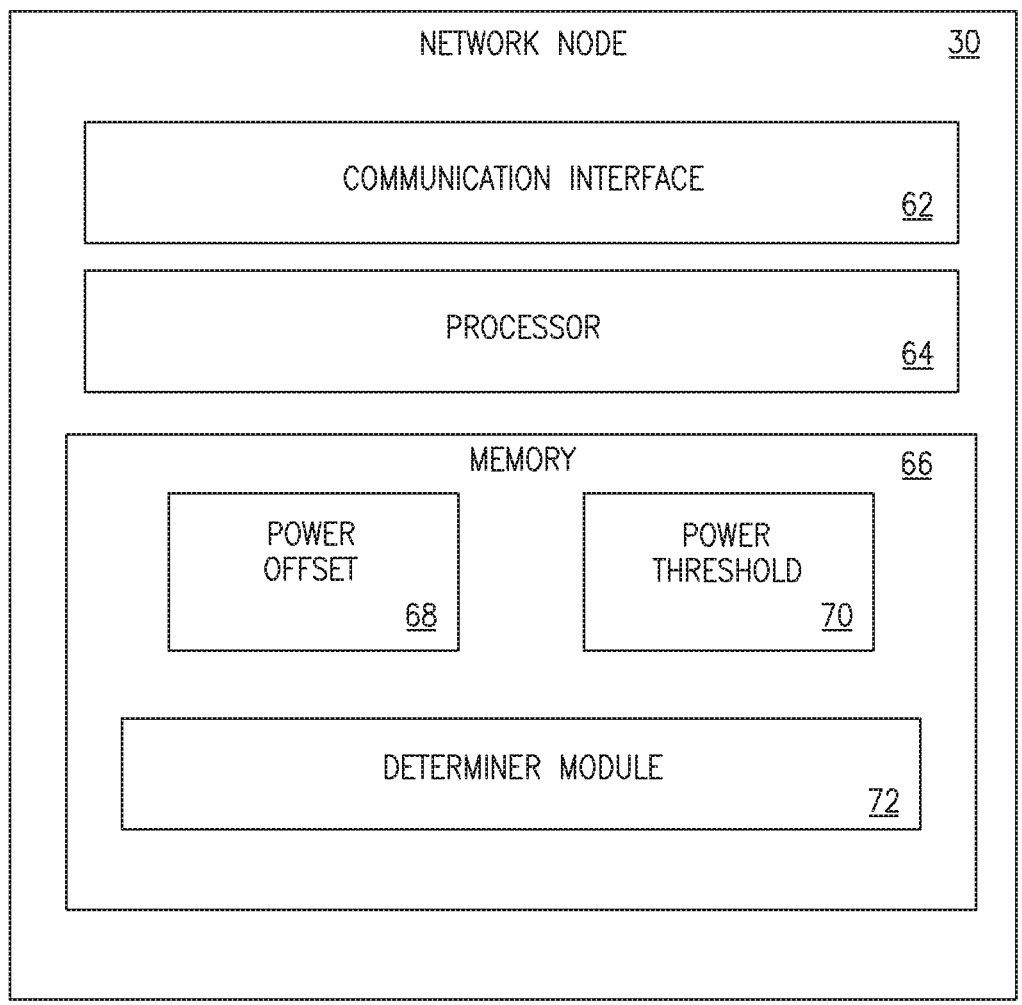
FIG. 9 is a block diagram of a network node according to one embodiment.

Referring to FIG. 8, in one embodiment, the memory 38 of the wireless device 32 may include executable instructions that, when executed by the processor 40, perform functions for setting a power of a SD2DSS. The executable instructions may be arranged as software modules. For example, a signal power determiner module 54 is configured to determine a power of a first signal such as a D2D signal. A threshold comparator module 56 is configured to compare a power of the first signal to a power threshold 44. An SD2DSS power setting module 58 is configured to set a power of the SD2DSS.

In some embodiments, the first signal is the PD2DSS. In some embodiments, the SD2DSS has a predetermined or configurable power offset 42 with respect to the PD2DSS or other D2D signals. For example, the PD2DSS may be transmitted with maximum transmission power, where the SD2DSS has a predetermined power offset 42 compared to the PD2DSS, such as a −2 dB offset. As another example, the PD2DSS may be transmitted with maximum transmission power, where the SD2DSS has a configurable power offset, such as −1, −2, −3 or −4 dB. The configurable power offset 42 may be provided by the network in a control message that can be wireless device-specific or common to multiple wireless devices. As yet another example, the SD2DSS may have a pre-defined or configurable power offset compared to other signals, such as a scheduling assignment, a physical D2D synchronization shared channel (PD2DSCH), or data channels.

In another embodiment, the SD2DSS has a power reduction that is a function of the D2D transmission power. In this embodiment, the SD2DSS is power controlled only when the wireless device approaches maximum transmission power of the PD2DSS. The power reduction can be determined by specification, by the network, or autonomously by the wireless device. If the power reduction is determined by the network, some rules may be defined in order to allow the wireless device to tune its SD2DSS power as a function of, e.g., PD2DSS nominal power. An example of such a rule that may be specified or implemented autonomously by the wireless device is the following:

$$P_S = \min(P_P, P_{max,S})$$

where $P_S$ is the SD2DSS transmit power, $P_P$ is the nominal PD2DSS transmit power and $P_{max,S}$ is a power threshold.

As noted above, the power offset 42 can be determined by specification by a network node 30 of the network, such as a base station, or autonomously by the wireless device 32. If the power offset is determined by the network node 30, it can be signaled to the wireless device 32, such as by radio resource control (RRC) signaling or by common or dedicated control signal. If the power offset is determined by the wireless device 32 autonomously, the power offset does not need to be signaled and can be an implementation-specific value. The network may not need to be aware that the wireless device 32 applies a certain power offset to SD2DSS.

FIG. 8 is a block diagram of a network node 30 constructed in accordance with principles of the present embodiments. The network node 30 may be a base station such as an LTE eNodeB (eNB). The network node 30 includes a communication interface 62, a processor 64, and a memory 66. The processor 64 executes computer instructions stored in the memory 66 to perform functions of the network node 30, such as those described herein. The memory 66 is configured to store a power offset 68 and a power threshold 70. The communication interface 62 is configured to transmit one or both of these values to the wireless device 32. An embodiment of the network node 30 includes a determiner module 72 that contains computer instructions that, when executed by the processor 64, cause the processor to determine at least one of a power offset and a power threshold. The power offset 68 is determined to offset a secondary synchronization signal (SSS) at a wireless device 32 and the power threshold 70 is determined to compare to a primary synchronization signal, PSS, at the wireless device 32.

Figure 10:
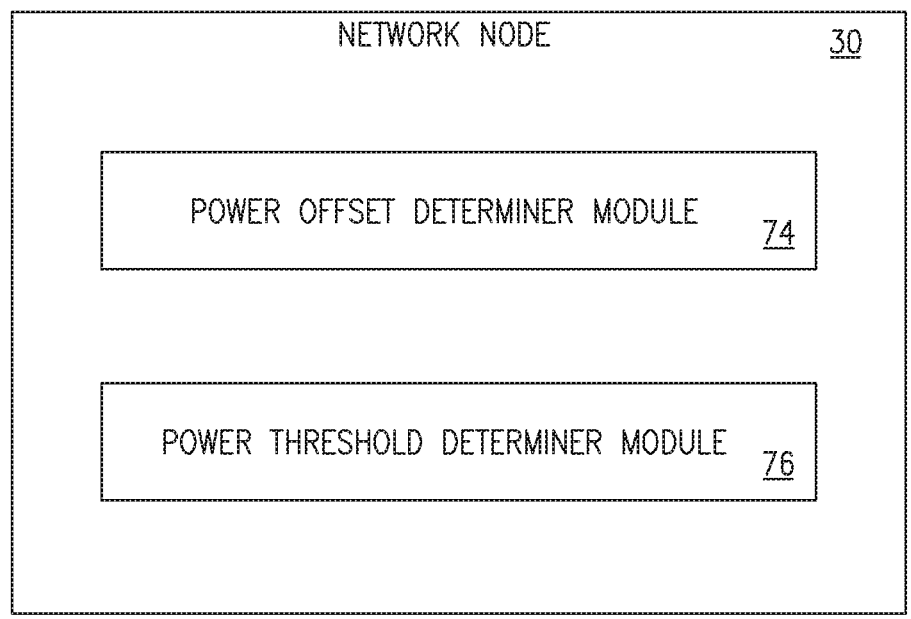
FIG. 10 is a block diagram of a network node according to another embodiment.

In some embodiments, the network node 30 may be configured with a processor executing computer instructions organized as software modules. Accordingly, FIG. 10 is a block diagram of a network node 30 having a power offset determiner module 74, and a power threshold determiner module 76. The power offset determiner module 74 determines a power offset used by a wireless device to set an SD2DSS. The power threshold determiner module 76 determines a power threshold used by the wireless device to determine when to set, e.g., adjust the SD2DSS. For example, if the PD2DSS exceeds the threshold, the wireless device will set the SD2DSS.

Figure 11:
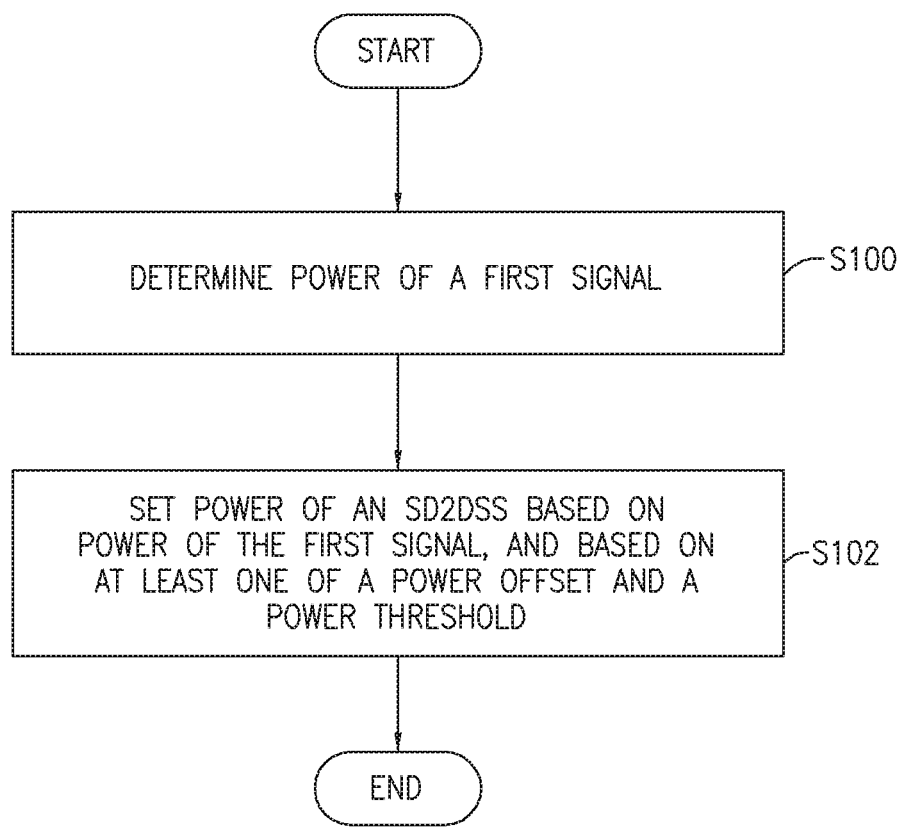
FIG. 11 is a flowchart of an exemplary process for setting power of an SSS based on power of another device-to-device (D2D) signal.

FIG. 11 is a flowchart of an exemplary process for setting power of an SSS based on power of another device-to-device (D2D) signal. A power of a D2D signal is determined (block S100). Power of an SSS signal may be set based on the power of the D2D signal (block S102). For example, the SSS signal may be set to be offset from a PSS by a fixed amount, such as 2 dB. In one embodiment, the power of the D2D signal may be monitored by a network node 30, such as base station 22. In another embodiment, the D2D signal may be monitored by a cluster head such as cluster head 32*b* or 24. In yet another embodiment, the D2D signal may be monitored by a wireless device 32*a* not serving as a cluster head.

Figure 12:
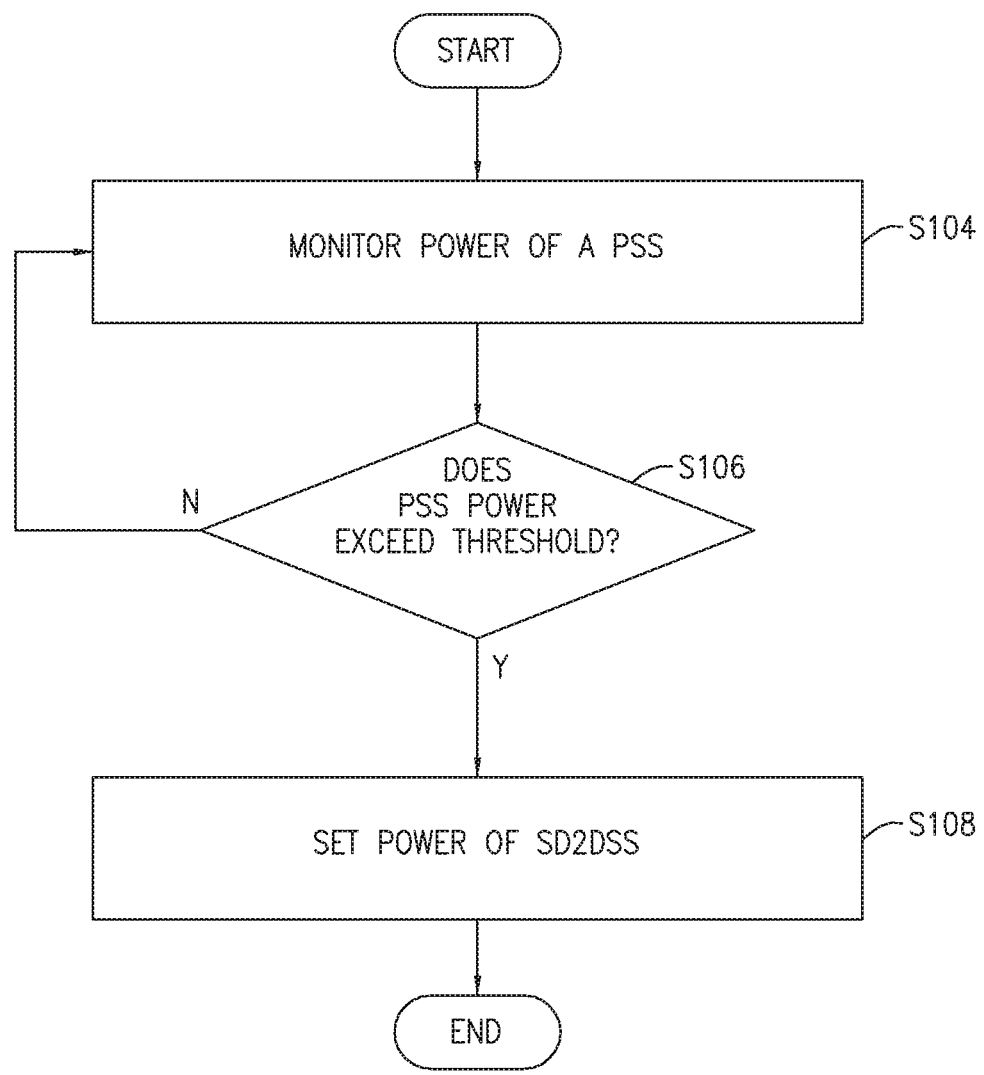
FIG. 12 is a flowchart of an exemplary process for conditionally setting power of an SSS based on power of a PSS.
Figure 13:
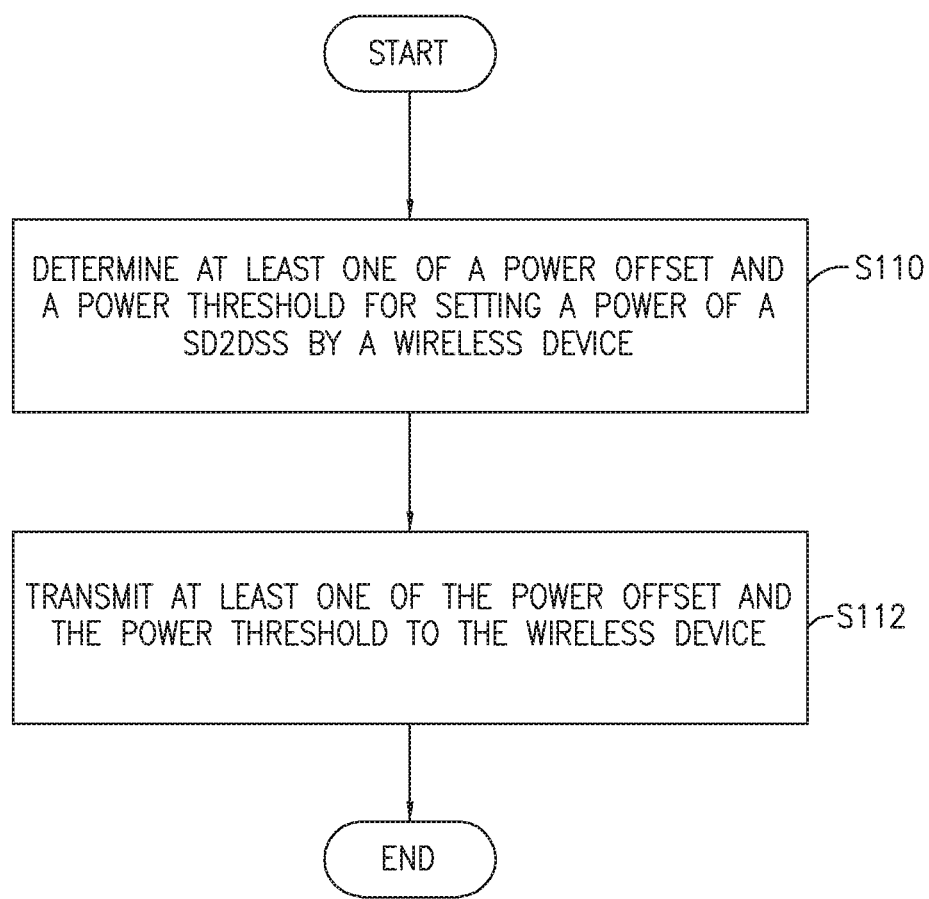
FIG. 13 is a flowchart of an exemplary process for determining a power offset at a base station and signaling the power offset to a wireless device.

FIG. 12 is a flowchart of an exemplary process for conditionally setting power of an SSS based on power of a PSS. The power of a PSS is monitored (block S104). If the power of the PSS exceeds a threshold, as determined in block S106, the power of the SSS is set, e.g., adjusted (block S 108). Otherwise the power of the PSS is continued to be monitored (block S104).

Thus, embodiments enable the achievement of trade-off between coverage of SD2DSS signals and implementation complexity for a transmitter of a wireless device.

Below follows a list of exemplary embodiments

Embodiment 1

A method at a wireless device of generating device-to-device, D2D, synchronization signals in a wireless communication network supporting D2D communication, the method comprising:

determining power of a first D2D signal; and adjusting power of a secondary synchronization signal, SSS, based on the first D2D signal power.

Embodiment 2

The method of Embodiment 1, wherein the first D2D signal is a signal of a wireless device, the wireless device performing the adjusting.

Embodiment 3

The method of Embodiment 1, wherein the first D2D signal is a primary synchronization signal, PSS.

Embodiment 4

The method of Embodiment 3, wherein the SSS power is adjusted to be offset from the PSS power by a pre-determined amount.

Embodiment 5

The method of Embodiment 4, wherein the SSS power is adjusted to be offset from the PSS power by 2 dB.

Embodiment 6

The method of Embodiment 3, wherein the SSS is offset from the PSS power only when the PSS power is at a maximum power level.

Embodiment 7

The method of Embodiment 1, wherein the adjusting of SSS power is performed autonomously by a user equipment.

Embodiment 8

The method of Embodiment 1, wherein the SSS power to which the SSS is adjusted is specified by a base station.

Embodiment 9

A wireless device comprising:

a memory, the memory configured to store an offset value; and a processor in communication with the memory, the processor configured to determine a power of a secondary synchronization signal, SSS, that is offset from a first device-to-device, D2D, signal by the offset value.

Embodiment 10

A wireless device, comprising:

a memory, the memory configured to store a power threshold; and a processor in communication with the memory, the processor configured to determine a power of a secondary synchronization signal, SSS, that is a minimum of a power threshold and a primary synchronization signal, PSS, power.

Embodiment 11

A wireless device, comprising:

a determiner module configured to determine a power of a first device-to-device, D2D, signal; and an adjusting module configured to adjust a power of a secondary synchronization signal, SSS, based on the first D2D signal.

Embodiment 12

A method at a network node for controlling power of synchronization signals of a wireless device, the method comprising:

determining at least one of a power offset to offset a power of a secondary synchronization signal, SSS, at the wireless device and a power threshold to compare to a primary synchronization signal, PSS, at the wireless device; and transmitting the at least one of the power offset and the power threshold to the wireless device.

Embodiment 13

A network node, comprising:

a memory configured to store at least one of a power offset and a power threshold, the power offset determined to offset a secondary synchronization signal (SSS) at a wireless device and the power threshold determined to compare to a primary synchronization signal, PSS, at the wireless device; and a transmitter configured to transmit that at least one of the power offset and the power threshold to the wireless device.

Embodiment 14

A network node, comprising:

a determiner module configured to determine at least one of a power offset and a power threshold, the power offset determined to offset a secondary synchronization signal (SSS) at a wireless device and the power threshold determined to compare to a primary synchronization signal, PSS, at the wireless device; and a transmission module configured to transmit that at least one of the determined power offset and the power threshold to the wireless device.

Embodiments can be realized in hardware, or a combination of hardware and software. Any kind of computing system, or other apparatus adapted for carrying out the methods described herein, is suited to perform the functions described herein. A typical combination of hardware and software could be a specialized computer system, having one or more processing elements and a computer program stored on a storage medium that, when loaded and executed, controls the computer system such that it carries out the methods described herein. Embodiments can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method of setting a power of a secondary device-to-device synchronization signal, SD2DSS, by a first wireless device to enable a second wireless device to synchronize timing of the second wireless device to a timing derived from the first wireless device, the method comprising:
   determining power of a primary device to device synchronization signal, PD2DSS, transmitted by the first wireless device;
   setting the power of the SD2DSS to be less than the power of the PD2DSS; and
   transmitting the SD2DSS with a power less than the PD2DSS.

2. The method of claim 1, wherein the PD2DSS includes a Zadoff-Chu, ZC, sequence and the SD2DSS includes an M sequence.

3. The method of claim 1, wherein the power of the SD2DSS is the minimum of a nominal value of the power of the PD2DSS and a power threshold.

4. The method of claim 1, wherein the set power of the SD2DSS is adjusted only when the power of the PD2DSS exceeds a predetermined amount.

5. The method of claim 1, wherein a same circuitry generates the SD2DSS and a secondary synchronization signal, SSS.

6. The method of claim 1, wherein the SD2DSS is transmitted with a power less than the PD2DSS as determined by a power offset compared to the PD2DSS.

7. The method of claim 6, wherein the power offset is −4 dB.

8. The method of claim 6 wherein the power offset is determined autonomously by the first wireless device.

9. A wireless device configured to set a power of a secondary device-to-device synchronization signal, SD2DSS, to enable a second wireless device to synchronize timing of the second wireless device to a timing of the wireless device, the wireless device comprising:
   a processor; and
   a memory, the memory containing instructions executable by the processor, the instructions when executed configure the processor to:
      determine power of a primary device to device synchronization signal, PD2DSS, transmitted by the wireless device;
      set the power of the SD2DSS to be less than the power of the PD2DSS; and
      transmit the SD2DSS with a power less than the PD2DSS.

10. The wireless device of claim 9, wherein the PD2DSS includes a Zadoff-Chu, ZC, sequence and the SD2DSS includes an M sequence.

11. The wireless device of claim 9, wherein the power of the SD2DSS is a minimum of a nominal value of the power of the PD2DSS and a power threshold.

12. The wireless device of claim 9, wherein the SD2DSS is transmitted with a power less than the PD2DSS as determined by a power offset compared to the PD2DSS.

13. The wireless device of claim 12, wherein the power offset is determined autonomously by the wireless device.

14. The wireless device of claim 12, wherein the power offset is one of configurable and predetermined.

15. A method of determining and transmitting one of a power offset and a power threshold to a wireless device, the method comprising:
   determining at least one of a power offset and a power threshold for setting a power of a secondary device to device synchronization signal, SD2DSS, by a wireless device, the SD2DSS being transmitted with a power less than a primary device to device synchronization signal, PD2DSS; and
   transmitting at least one of the power offset and the power threshold to the wireless device.

16. A network node, comprising:
   a processor;
   a memory containing instructions that when executed by the processor configure the processor to determine at least one of a power offset and a power threshold for setting a power of secondary device to device synchronization signal, SD2DSS by a wireless device;
   a communication interface configured to transmit at least one of the power offset and the power threshold to the wireless device, the power of the SD2DSS being transmitted with a power less than a primary device to device synchronization signal, PD2DSS; and
   the memory configured to store the at least one of the power offset and the power threshold.

* * * * *

UNITED STATES PATENT AND TRADEMARK OFFICE
CERTIFICATE OF CORRECTION

PATENT NO. : 10,098,079 B2  Page 1 of 1
APPLICATION NO. : 15/650172
DATED : October 9, 2018
INVENTOR(S) : Zhao et al.

It is certified that error appears in the above-identified patent and that said Letters Patent is hereby corrected as shown below:

In the Drawings

Figure 4:
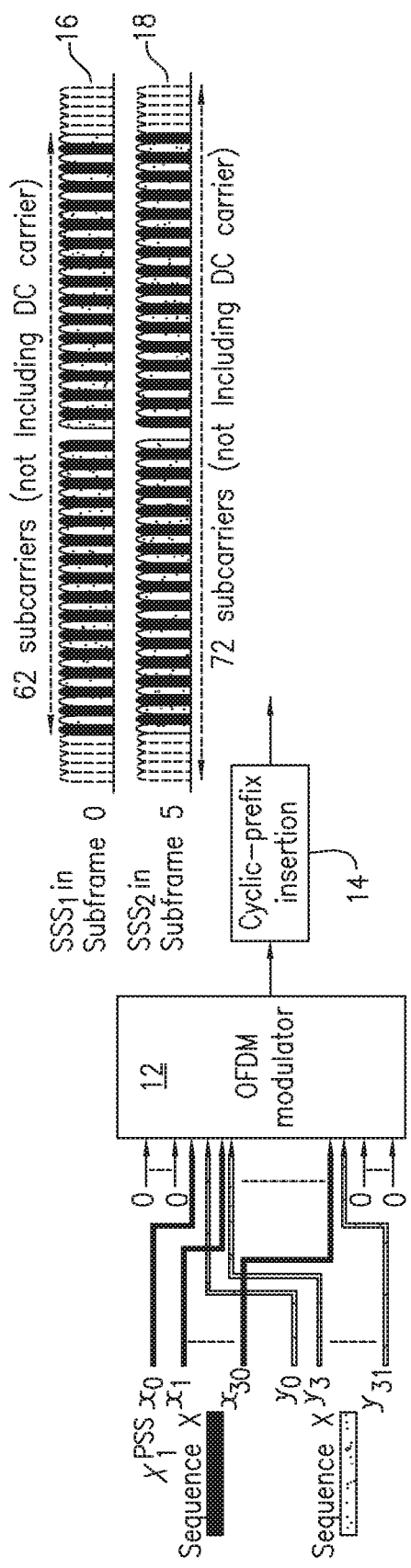
FIG. 4 is a diagram of two sequences being swapped in the frequency domain.
Figure 5:
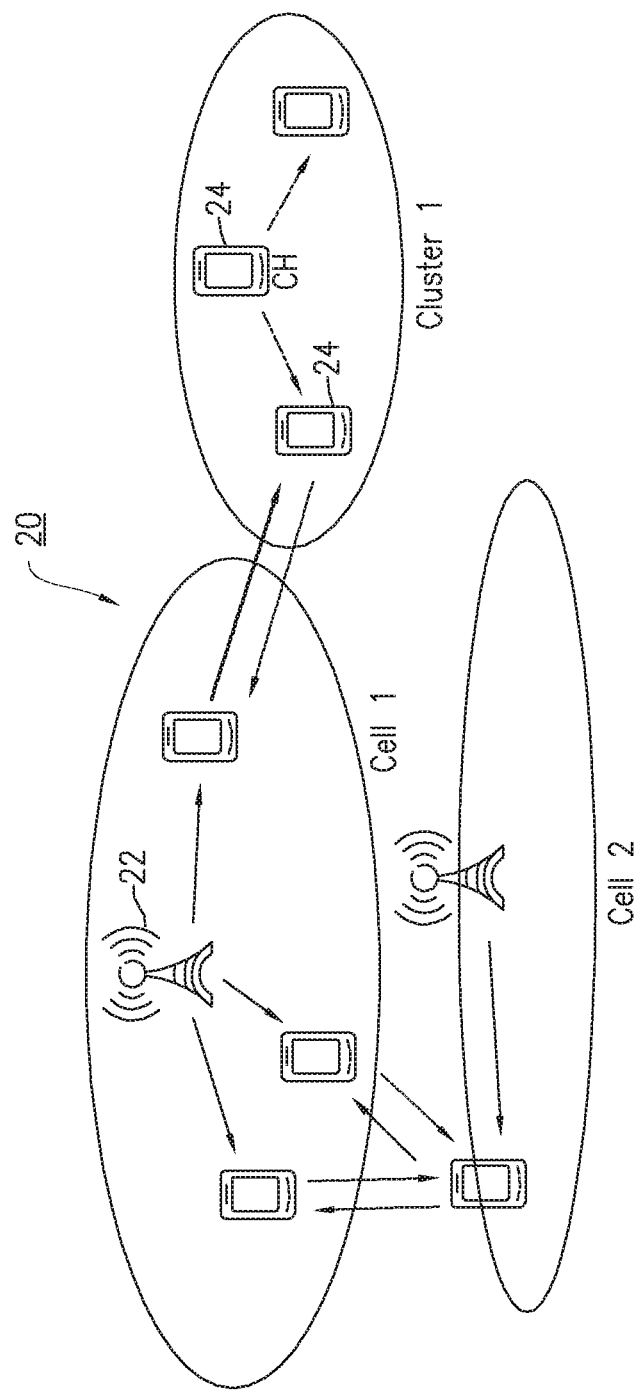
FIG. 5 is a diagram of a communication system with a base station and a cluster head.

In Fig. 4, Sheet 3 of 12, delete " 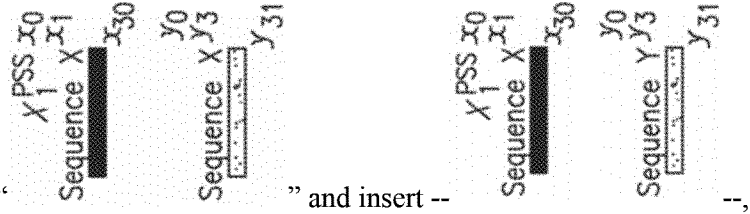 " and insert -- -- , therefor.

In the Specification

In Column 1, Line 10, delete "SIGNAL, which" and insert -- SIGNAL, now Pat. No. 9,807,711, which --, therefor.

In Column 8, Line 66, delete "S 108)." and insert -- S108). --, therefor.

Signed and Sealed this
Ninth Day of April, 2019

Andrei Iancu
*Director of the United States Patent and Trademark Office*